(12) United States Patent
Paquelet (10) Patent No.: US 7,519,108 B2
(45) Date of Patent: Apr. 14, 2009

(54) METHOD AND DEVICE FOR CHARACTERIZING ULTRA-WIDE BAND (UWB) PULSE SEQUENCES

(75) Inventor: Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 750 days.

(21) Appl. No.: 11/085,517

(22) Filed: Mar. 22, 2005

(65) Prior Publication Data

US 2005/0271118 A1     Dec. 8, 2005

(30) Foreign Application Priority Data

Mar. 22, 2004   (EP)   ................... 04290763

(51) Int. Cl.
*H04B 1/00*   (2006.01)
(52) U.S. Cl. ...................... 375/150; 375/130
(58) Field of Classification Search ............ 375/130, 375/150
See application file for complete search history.

(56) References Cited

U.S. PATENT DOCUMENTS

| | | | | |
|---|---|---|---|---|
| 5,166,952 A | * | 11/1992 | Omura et al. ............. | 375/149 |
| 6,282,228 B1 | * | 8/2001 | Monroe ..................... | 375/140 |
| 6,317,452 B1 | * | 11/2001 | Durrant et al. ............ | 375/130 |
| 2002/0075972 A1 | * | 6/2002 | Richards et al. .......... | 375/324 |
| 2005/0271118 A1 | | 12/2005 | Paquelet | |

FOREIGN PATENT DOCUMENTS

WO   WO 2004/015883 A1   2/2004

OTHER PUBLICATIONS

Zhengyuan Xu, et al., "Frequency-Domain Estimation of Multiple Access Ultra-Wideband Signals", 2003 IEEE Workshop on Statistical Signal Processing, Sep. 28, 2003, pp. 74-77.
Younes Souilmi, et al., "On the Achievable Rates of Ultra-Wideband PPM with Non-Coherent Detection in Multipath Environments", 2003 IEEE International Conference on Communications, vol. 1 of 5, May 11, 2003, pp. 3530-3534.
U.S. Appl. No. 11/082,898, filed Mar. 18, 2005, Paquelet et al.
U.S. Appl. No. 11/085,517, filed Mar. 22, 2005, Paquelet.
U.S. Appl. No. 11/436,702, filed May 19, 2006, Paquelet, et al.

* cited by examiner

*Primary Examiner*—Juan A Torres
(74) *Attorney, Agent, or Firm*—Oblon, Spivak, McClelland, Maier & Neustadt, P.C.

(57) ABSTRACT

The invention relates to a method for transmitting at least one sequence of Np pulses over Np time windows, each pulse being enclosed within a predetermined time chip Tc. The method according to the invention includes a signal characterization step, in the course of which Np detection windows Dj (for j=1 to Np) encompassing predetermined time chips are examined by performing correlations over the detection windows Dj of the received signal with at least a first and a second sinusoidal signal S1 and S2.The method according to the invention enables to limit the processing time and power needed for carrying out the characterization step, which only requires to examine detection windows defined by a signature of a transmitter by using sinusoidal signals, instead of mapping the whole pulse sequence by a correlation with expected pulses.

8 Claims, 4 Drawing Sheets

METHOD AND DEVICE FOR CHARACTERIZING ULTRA-WIDE BAND (UWB) PULSE SEQUENCES

BACKGROUND OF THE INVENTION

1. Field of the Invention

The present invention relates to a method for transmitting data in a telecommunication system including at least one transmitter and one receiver, said transmitter being intended to transmit a signal formed by at least one sequence of Np pulses over Np time windows, each pulse being enclosed within a time chip whose position within its relevant time window is defined by a chip number.

So-called Ultra-Wide Band systems (further referred to as UWB systems) are currently studied with the aim of assessing their relevance for future wireless mobile communication techniques. In such a UWB system, each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

The above-described signal may form a carrying signal on which information can be encoded by modulation of said carrying signal, for example by performing phase or amplitude modulation of one or more pulse sequences.

2. Description of the Related Art

A major problem which hinders development of such systems lies in the identification, by a receiver, of relevant information carried by incoming signals. In the present state of the art, a signal characterization is often performed by the receiver by correlating a received signal delivered at the output of a receiving antenna, which received signal may be exclusively constituted by noise or, alternatively, may include an incoming carrying signal, with a gliding model of the waveform such a carrying signal should have. Such a gliding correlation enables to obtain an exhaustive knowledge of the received signal, by performing in effect a complete mapping of this signal, which will yield all useful information related, for example, to the phase or to the amplitude of this signal.

Unfortunately, this gliding correlation technique is not realistically applicable as such to the characterization of sequences of Np pulses lasting less than 0.1 ns each and enclosed in time windows having each a width of roughly 100 ns. In such an example, with for example Np=128 and a sampling interval of 10 ps, the scanning of the whole duration of a pulse sequence would require $1.28.10^6$ successive pulse sequences for its completion and would then last 16 seconds, which is not acceptable.

It should also be noted that, during the considerable time required for performing the characterization of a pulse sequence according to the gliding correlation technique described above, communication conditions between the transmitter and the receiver may change, i.e. a communication channel between these devices may be altered, for example due to movements of one or both devices, in the course of a single signal characterization step, with adverse effects on the accuracy of the results yielded by said signal characterization step. The signal carrying the pulse sequences may even disappear before its characterization is completed.

SUMMARY OF THE INVENTION

The invention aims at solving the aforementioned problems, by providing a method for preprocessing data as described in the opening paragraph, which method includes at least one signal characterization step which may be carried out far more quickly and easily than currently used signal detection techniques.

Indeed, a method for transmitting data according to the opening paragraph is characterized according to the invention in that it includes at least one signal characterization step to be executed by said receiver, in the course of which Np detection windows encompassing the time chips defined by the chip numbers are to be examined in search of an expected pulse sequence by performing at least a first and a second correlation over said detection windows of a signal representative of the received signal with at least a first and a second sinusoidal signal, respectively, which first and second sinusoidal signals are in phase quadrature with respect to each other, said first and second correlations being intended to produce first and second correlation values representative of the amplitude and phase of a received pulse sequence.

In the characterization step according to the invention, the received signal is not scanned exhaustively during the whole duration of an expected pulse sequence, as is done in the known gliding correlation technique. The scanning is instead restricted to selected portions of the expected pulse sequence. This restriction is a consequence of a difference in purpose between the detection step according to the invention and the detection steps already known in the art.

Indeed, a known characterization step performed by means of a gliding correlation over the whole duration of an expected pulse sequence aims at exhaustively mapping a received sequence, whereas the characterization step according to the invention only aims at producing signals whose values are representative of parameters of the received sequence such as its phase and amplitude. The whole duration of a single expected sequence may thus be scanned stepwise, each step having a duration of the order of 10 ns in the same conditions as those described above, which means that the scanning of a duration of an expected sequence of Np=128 pulses will only require $1.28.10^3$ successive pulse sequences for its completion and would last 16 milliseconds, i.e. one thousand times less than according to the gliding correlation technique described above.

The invention is linked to an observation made by the inventor according to which, for the sole purpose of characterizing an incoming signal, i.e. for extracting from said signal values representative of essential intrinsic parameters of the incoming signal, such as the phase and amplitude of pulses possibly carried by said signal, an exhaustive mapping of the incoming signal is superfluous. The present invention thus enables to limit the processing time and power required for carrying out the characterization step by only scanning detection windows defined by the signature of the transmitter, which will have been communicated beforehand to the receiver.

The use of sinusoidal signals for detecting incoming pulse sequences instead of pulses having a form similar to that of the expected pulses may in itself appear quite surprising, since it goes against the so-called theory of coherent systems. Nevertheless, explanations given hereinafter will demonstrate the efficiency and the validity of the choice made by the inventor.

The fact that, according to the invention, the received signal is to be correlated with sinusoidal signals enables a far more simple implementation of the detection step as is done in the known art, where a gliding correlation requires to generate, at the receiver end, pulses having the same form as those to be detected, whereas sinusoidal signals may be generated by off-the-shelf oscillators well-known to any skilled in the art, any kind of later processing to be applied to such sinusoidal signals being also simplified for like reasons.

According to one of its hardware-oriented aspects, the invention also relates to a telecommunication system including at least one transmitter and one receive, said transmitter being intended to transmit a signal formed by at least one sequence of Np pulses over Np time windows, each pulse being enclosed within a time chip whose position within its relevant time window is defined by a chip number, system in which the receiver includes signal detection means intended to perform an examination of Np detection windows encompassing the time chips defined by the chip numbers in search of an expected pulse sequence, said characterization means including at least first and second correlation means for correlating a signal representative of the received signal with at least a first and a second sinusoidal signal, respectively, which first and second sinusoidal signals are in phase quadrature with respect to each other, said first and second correlation means being intended to be activated during said detection windows and to produce first and second correlation values representative of the amplitude and phase of a received pulse sequence.

According to a particular embodiment of such a system, the characterization means further include at least third and fourth correlation means for correlating a signal representative of the received signal with at least a third and a fourth sinusoidal signal, respectively, which third and fourth sinusoidal signals are in phase quadrature with respect to each other, said third and fourth correlation means being intended to be activated during said detection windows and to produce third and fourth correlation values representative of the amplitude and phase of a received pulse sequence, the detection means also including a phase quadrature demodulator intended to be fed with the received signal and to respectively deliver a first and a second demodulated signal to the first and second correlation means, on the one hand, and to the third and fourth correlation means, on the other hand, which first and second demodulated signals are in phase quadrature with respect to each other.

According to known phase quadrature demodulation techniques, the phase quadrature demodulator will usually include two mixers intended to be fed with the received signal, on the one hand, and by demodulation signals in phase quadrature with each other having a predetermined so-called central frequency, the third and fourth sinusoidal signals being then respectively formed by the first and second sinusoidal signals. In a preferred embodiment of the invention, the characterization means will further include:
- an oscillator intended to generate an output signal from which the first and second sinusoidal signals will be derived, and
- a frequency multiplier intended to receive said output signal and to deliver respective first and second demodulation signals to the phase quadrature demodulator.

According to such an embodiment of the invention, the central frequency will have a value which will be a multiple of the frequency of the sinusoidal signals, which enables to use only one oscillator at the receiving end for performing both a frequency demodulation and a characterization of an incoming pulse sequence.

According to a preferred embodiment of the invention, the characterization means comprised in a system as described above further include:
- a plurality of accumulating modules, each of which being intended to accumulate output values delivered by one of said correlating means,
- a plurality of squaring modules, each of which being intended to produce a squared value of the contents of one of said accumulating modules, and
- an adder intended to compute a sum of output values delivered by the squaring modules in order to produce a detection value which will be compared to the predetermined threshold value.

According to another of its hardware-oriented aspects, the invention also relates to a telecommunication apparatus intended to receive a signal formed by at least one sequence of Np pulses over Np time windows, each pulse being enclosed within a time chip whose position within its relevant time window is defined by a chip number, which apparatus includes signal characterization means intended to perform an examination of Np detection windows encompassing the time chips defined by the chip numbers in search of an expected pulse sequence, said characterization means including at least first and second correlation means for correlating a signal representative of the received signal with at least a first and a second sinusoidal signal, respectively, which first and second sinusoidal signals are in phase quadrature with respect to each other, said first and second correlation means being intended to be activated during said detection windows and to produce first and second correlation values representative of the amplitude and phase of a received pulse sequence.

According to yet another of its hardware-related aspects, the invention also relates to a device intended to receive a signal formed by at least one sequence of Np pulses over Np time windows, each pulse being enclosed within a time chip whose position within its relevant time window is defined by a chip number, which device is intended to perform an examination of Np detection windows encompassing the time chips defined by the chip numbers in search of an expected pulse sequence, said device including at least first and second correlation means for correlating a signal representative of the received signal with at least a first and a second sinusoidal signal, respectively, which first and second sinusoidal signals are in phase quadrature with respect to each other, said first and second correlation means being intended to be activated during said detection windows and to produce first and second correlation values representative of the amplitude and phase of a received pulse sequence.

The characterization means included the above described apparatus and device will thus be able to execute a signal characterization step according to the above-described embodiments of the invention.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
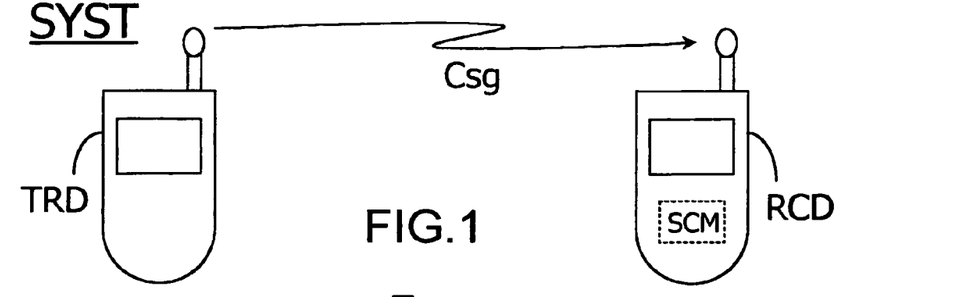
FIG. 1 is a functional diagram depicting a telecommunication system in which the invention is used.

FIG. 1 depicts a telecommunication system SYST in which the invention is embodied. This system SYST includes at least one transmitting apparatus TRD and one receiving apparatus RCD, which may for example be constituted by mobile phones. The transmitting apparatus TRD is intended to transmit a signal Csg formed by at least one sequence of Np pulses pj (for j=1 to Np) over Np time windows, each pulse being enclosed within a time chip whose position within its relevant time window is defined by a chip number cj (for j=1 to Np).

The receiving apparatus RCD is provided with characterization means SCM for characterizing such an incoming signal Csg, i.e. for deriving from said signal Csg other signals whose values are representative of essential intrinsic parameters of the incoming signal Csg, such as the phase and amplitude of pulses possibly carried by said signal Csg, which characterization means SCM may also be additionally used for detecting pulse sequences carried by the incoming signal Csg.

This signal Csg may form a carrying signal on which information can be encoded by the transmitting apparatus TRD by means of a modulation of said carrying signal Csg, for example by performing phase or amplitude modulation of one or more pulse sequences.

Figure 2:
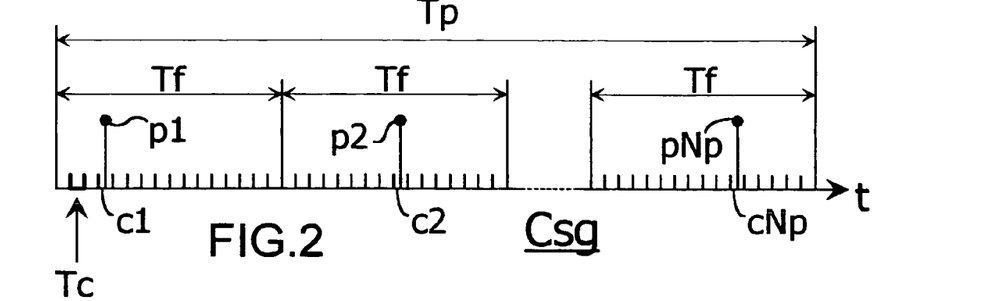
FIG. 2 is a chronogram depicting a pulse sequence constituting a carrying signal transmitted in such a telecommunication system.

FIG. 2 depicts such a carrying signal Csg in the form of a chronogram, according to which each pulse sequence has a total duration Tp divided into time windows having each a duration Tf, each time window being sub-divided into time chips Tc, a single time chip within each window being intended to enclose a pulse pj (for i=1 to Np), which single time chip is identified by means of a chip number cj. The transmitter of this carrying signal Csg will thus be identified by a signature Sg=(c1, c2 . . . cNp) jointly formed by all above-mentioned chip numbers cj (for i=1 to Np), which signature Sg is in itself quite sturdy and may thus be reliably and accurately communicated to all potential receivers.

Figure 3:
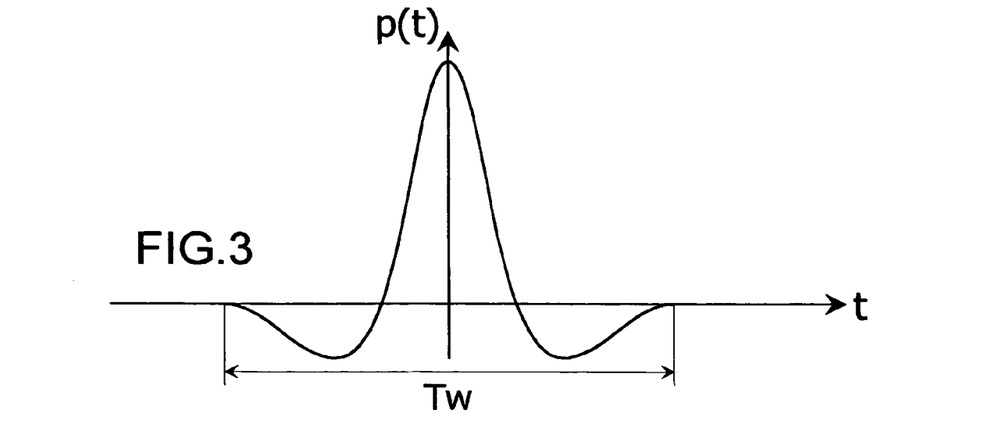
FIG. 3 is a chronogram depicting a pulse model which may be used for generating such a sequence.

FIG. 3 is another chronogram which depicts a possible shape p(t) which may be chosen for constituting the above-mentioned pulses. In the example depicted here, this pulse p(t) is defined as a derivative of the second order of a Gaussian function, which may be expressed mathematically as $p(t) = A \cdot [1-4\pi(t/Tw)^2] \cdot \exp(-2\pi(t/Tw)^2)$. Other pulse shapes known to those skilled in the art may, of course, be used in this same purpose.

Figure 4:
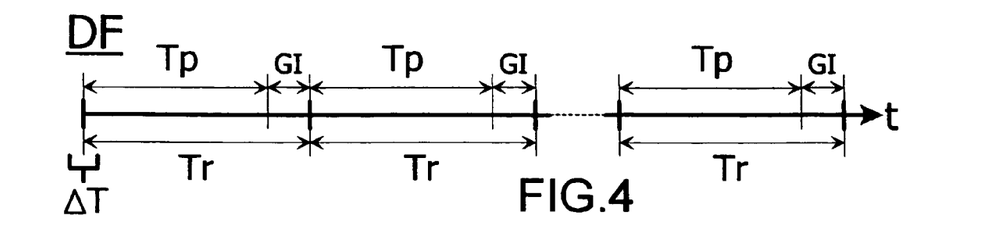
FIG. 4 is a chronogram depicting a data frame including a pluralty of pulse sequences.

FIG. 4 is yet another chronogram which depicts a data frame DF formed by successive pulse sequences such as the one described above, each having a total duration Tp, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with Tr=Tp+GI, and including each a pulse sequence as described above.

A device intended to receive a data frame DF must thus be able to detect the beginning of a pulse sequence such as those described above during a given time interval $\Delta T$.

Figure 5:
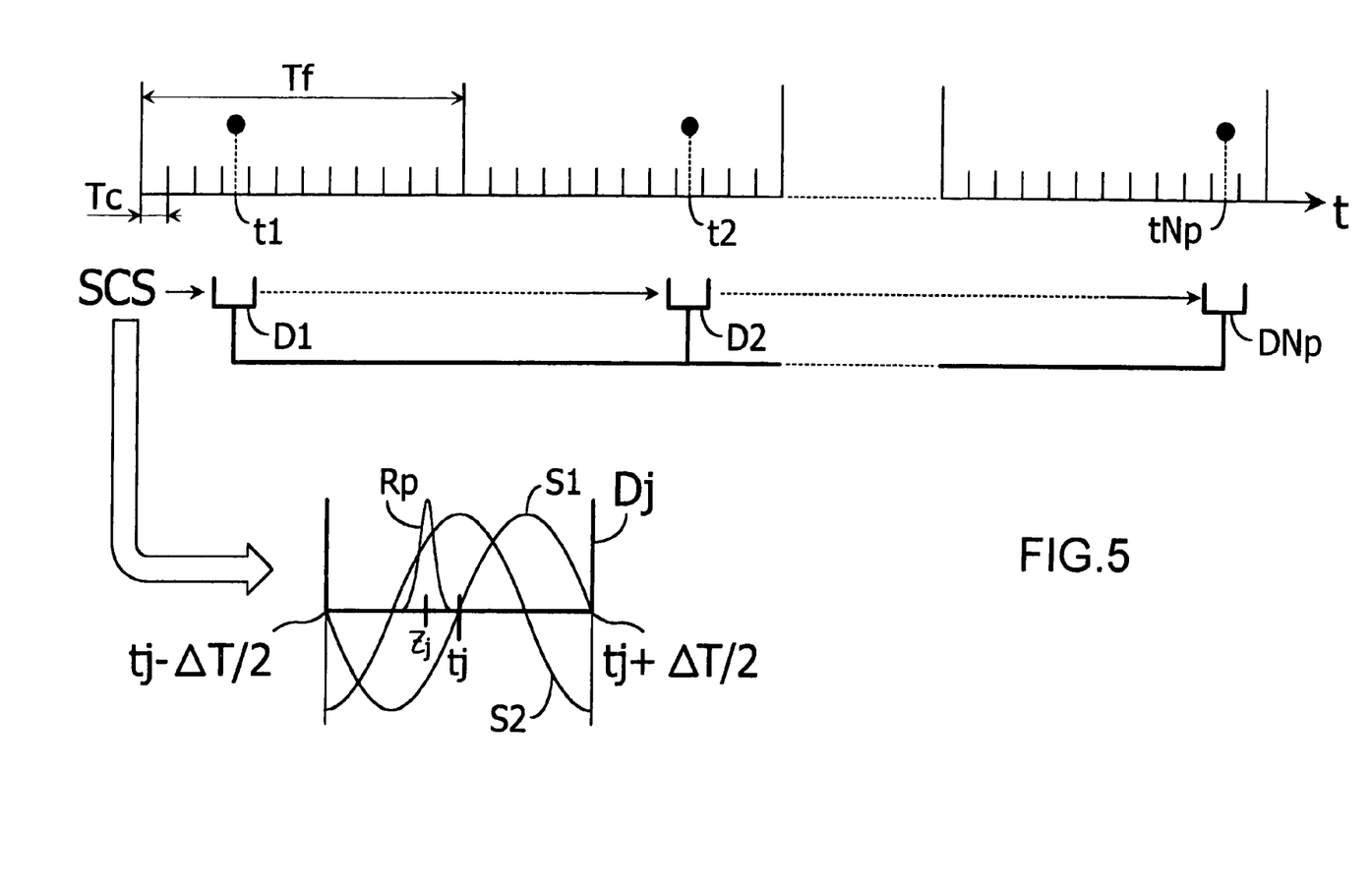
FIG. 5 is a chronogram depicting a signal characterization step according to the invention.

FIG. 5 depicts how such a pulse sequence may advantageously be detected by a device intended to receive this sequence. According to the present invention, such a device will carry out a signal characterization step SCS in the course of which Np detection windows Dj (for j=1 to Np) encompassing the time chips defined by the chip numbers are to be examined in search of pulses belonging to an expected pulse sequence, which pulses are shown in dashed lines in this Figure. Each detection window Dj (for j=1 to Np) is wider than a single time chip duration Tc, and has a duration $\Delta T$, which means that carrying out the detection step SCS depicted here amounts to providing an answer to a problem consisting for a receiving device in determining if a pulse sequence transmitted under a known signature and intended to be received by said device has or not started during a given time interval $\Delta T$.

The method according to the invention only requires to scan selected time windows Dj centered on moments tj (for j=1 to Np) defined by their respective associated chip numbers, in search of expected pulses.

This enables to determine in a single step if a given pulse sequence starts or not within a given time interval $\Delta T$, whereas in the known detection technique, such a statement may only be established after performing numerous elementary correlations for achieving an exhaustive scanning of the whole duration Tp of said given sequence.

A possible way of carrying out the scanning of the detection windows Dj according to the invention is also shown in this Figure. Each detection window Dj is centered on a given instant tj and defined by lower and upper bounds respectively equal to $tj - \Delta T/2$ and $tj + \Delta T/2$. In this example, a detection value is computed as a mean value over all detection windows of a first and a second correlation between the received signal and a first and second sinusoidal signal S1 and S2, respectively, which first and second sinusoidal signals S1 and S2 are in phase quadrature with each other. This detection value will then be compared to a predetermined threshold value.

The efficiency of the method according to the invention is based on the following observation: since the width of a received pulse Rp occurring at an instant tj is far smaller than that of a detection window Dj, a correlation between the received signal and a sinusoidal signal, for example a first sinusoidal signal S1 expressed as $\sin(2\pi t/\Delta T)$, which correlation is defined as $$\int_{-\frac{\Delta T}{2}}^{\frac{\Delta T}{2}} p(t-\tau) \sin\left(\frac{2\pi t}{\Delta T}\right) dt$$

may be expressed as $$\sin\left(\frac{2\pi \tau}{\Delta T}\right) \cdot \int_{-\frac{\Delta T}{2}}^{\frac{\Delta T}{2}} p(t) dt, \text{ with } \int_{-\frac{\Delta T}{2}}^{\frac{\Delta T}{2}} p(t) dt = \alpha,$$

where $\alpha$ is proportional to the energy carried by the pulse Rp.

The first and second correlation values, noted Cs1 and Cs2 produced by correlating over the detection windows Dj the received signal with the first and second sinusoidal signals S1 and S2 may thus be expressed as:

$$\begin{cases} \alpha \cdot \sin\left(\frac{2\pi\tau}{\Delta T}\right) = Cs1 \\ \alpha \cdot \cos\left(\frac{2\pi\tau}{\Delta T}\right) = Cs2 \end{cases},$$

which will constitute an easily solvable equation system once the correlation values Cs1 and Cs2 will have been measured.

Each correlation performed between the received signal and one of the first and second sinusoidal signals S1 and S2 will preferably be squared so as to emphasize occurrences where a received pulse Rp is indeed present within detection window Dj, with respect to freak occurrences where a noise peak may produce a significant value of the scalar product described above, the amplitude of such a noise peak being lower than that of an actually received pulse Rp.

Due to the very nature of the pulse sequences to be detected, a time delay between an instant $\tau_j$ of occurrence of a pulse Rp and the predetermined instant tj will be caused by a phase-shift affecting the whole sequence, so that this time delay tj-$\tau_j$ will have a constant value for all time windows. This will entail that an accumulation of the correlation values for all detection windows will automatically enable an in-phase addition of the received pulses, and thus an amplification of the impact of these pulses, simultaneously with an attenuation of the impact of freak pulses due to irrelevant noise, provided that the width $\Delta T$ of a detection window Dj is an integer multiple of the period of the first and second sinusoidal signals S1 and S2.

The inventor has furthermore observed that the use of a squared correlation value also enables to simplify the implementation of a signal detection step in the course of which only an information representative of the energy carried by the incoming signal has to be computed.

Indeed, since $\alpha^2 \cdot \cos^2(2\pi\tau/\Delta T) + \alpha^2 \cdot \sin^2(2\pi\tau/\Delta T) = \alpha^2$, a sum of the results of the above described squared correlations will yield a detection value representative of the energy carried by the received signal.

Figure 6:
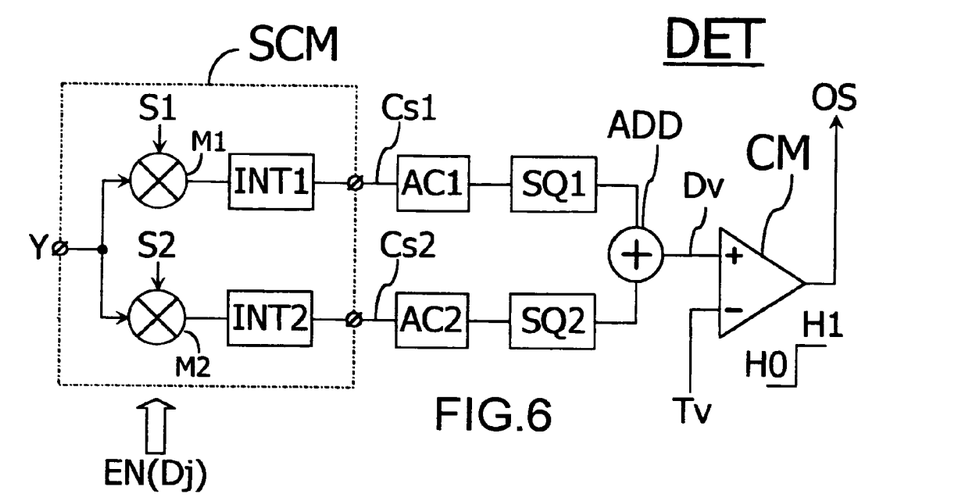
FIG. 6 is a block diagram depicting signal detection means making use of a pre-processing device according to a possible embodiment of the invention.

FIG. 6 schematically shows detection means DET including signal characterization means SCM intended to implement the above described characterization step, in order to produce a detection value Dv, which is to be compared to a threshold value Tv by comparison means CM which may be formed by a simple operational amplifier intended to deliver a two-state output signal OS whose value will determine whether an incoming pulse has been detected or not.

The received signal Y will be deemed corresponding to a state H1 in which a pulse sequence is actually carried by said signal Y, if Dv exceeds a predetermined threshold value noted Tv, the received signal Y being deemed corresponding to a state H0 in which only noise is actually carried by said signal Y, if Dv<Tv.

In the example shown here, the characterization means SCM include a first and a second signal mixer M1 and M2, for example constituted by Gilbert cells, intended to multiply a signal Y received by the receiver with a first and a second sinusoidal signal S1 and S2, respectively, with S1=sin(2πt/ΔT) and S2=cos(2πt/ΔT). The characterization means SCM further include first and second integrators INT1 and INT2, respectively intended to integrate signals outputted by the first and second signal mixers M1 and M2, and thus to deliver correlated signals Cs1 and Cs2, respectively resulting from a correlation between the received signal Y with the first sinusoidal signal S1, on the one hand, and with the second sinusoidal signal S2 on the other hand.

In the embodiment described here, the first and second mixers M1 and M2 will be activated by means of an activation signal EN(Dj) only during the detections windows Dj, which may for example be performed by connecting said mixers to their power supply or to an input terminal intended to receive the signal Y, only during said detections windows Dj, which entails that the first and second correlation means formed by the respective assemblies of the first and second mixers M1 and M2 with the first and second integrators INT1 and INT2 will be disabled outside of the detection windows Dj. A same result may be obtained in other embodiments by similarly controlling the power supply of the integrators, which may for example be formed by operational amplifiers provided with RC feedback loops.

In the example described here, the values of these correlated signals Cs1 and Cs2 are intended to be accumulated during successive detections windows Dj by means of first and second accumulators AC1 and AC2. The detection means DET further include first and second squaring modules SQ1 and SQ2, respectively intended to produce a squared value of the contents of the first and second accumulating modules AC1 and AC2, which squared values are then to be added together by an adder ADD also included in the detection means DET shown here, and intended to output a detection value Dv which will be proportional to the energy carried by the received signal Y, as explained hereinbefore.

Figure 7:
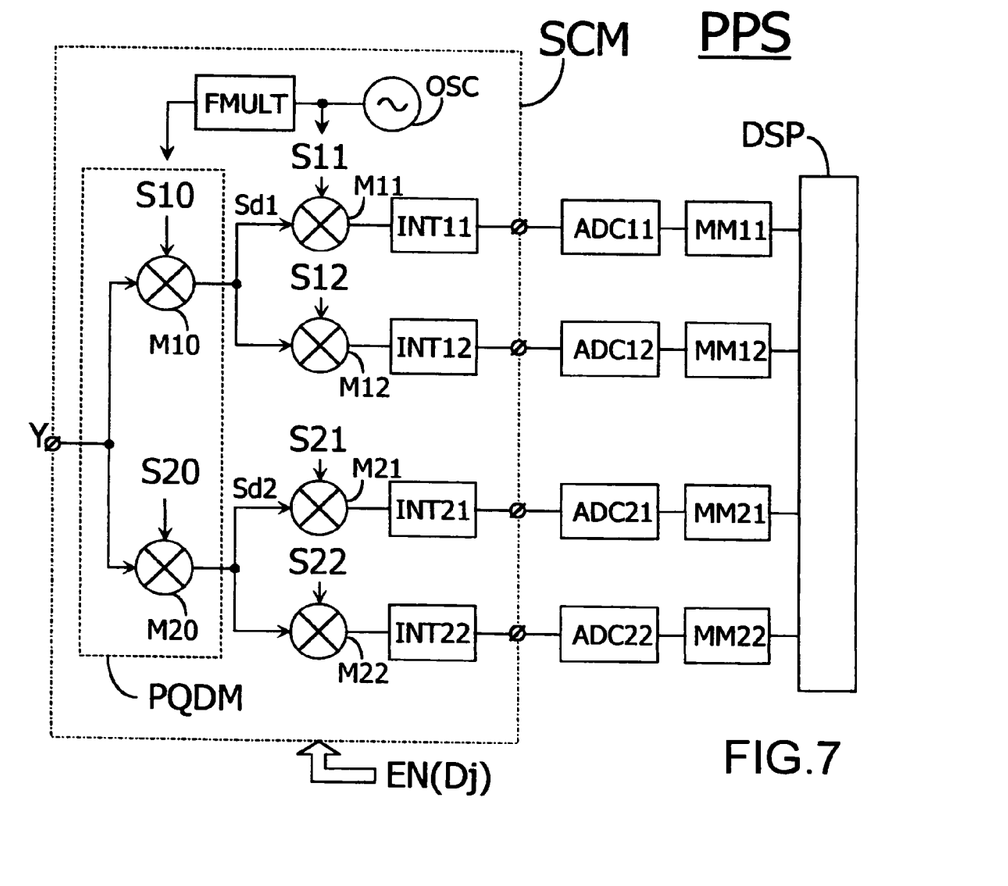
FIG. 7 is a block diagram depicting a pre-processing device according to a preferred embodiment of the invention.

FIG. 7 schematically shows a pre-processing stage PPS comprising signal characterization means SCM according to another embodiment of the invention, which signal characterization means SCM include a phase quadrature demodulator PQDM intended to be fed with the received signal Y and to respectively deliver a first and a second demodulated signal Sd1 and Sd2 to first and second correlation means (M11, INT11) and (M12, INT12), on the one hand, and to third and fourth correlation means (M21, INT21) and (M22, INT22), on the other hand, which first and second demodulated signals Sd1 and Sd2 are in phase quadrature with respect to each other.

The first, second, third and fourth correlation means (M11, INT11), (M12, INT12), (M21, INT21) and (M22, INT22) are respectively followed by first, second, third and fourth analog-to-digital converting modules ADC11, ADC12, ADC21 and ADC22, themselves followed by first, second, third and fourth memory modules MM11, MM12, MM21 and MM22, the outputs of which being connected to a digital signal processor DSP intended to process the information stored in the memory modules according to predetermined schemes defined by software which will have been previously loaded and memorized within the digital signal processor DSP.

This highly schematical diagram enables to show the very wide range of use of the invention, since, once converted into digital data, the results of the correlations performed by the characterization means SCM may be submitted to any kind of treatment by the digital signal processor DSP.

Another advantage of the invention is also visible here: indeed, as explained above, the invention enables to extract all significant information from the received signal Y without requiring a mapping of said signal. It is apparent from this drawing that the invention also enables to convert into digital data all significant information pertaining to the received signal Y without having to sample said signal in the usual sense. The resulting advantage lies in a reduction of the number of samples required for a same effect: according to a traditional Shannon sampling technique, and given the bandwidth of the pulse sequences (roughly 7 GHz) and the width of the detection windows (roughly 2 ns), around 30 sampled values would be necessary for correctly sampling each detection window, whereas the invention enables to reduce the number of usable scalar values to the four values outputted by the signal characterization means SCM, which amounts to reduce the total number of samples by an order of magnitude, and will enable to save storage resources and costs in the same proportion.

It should also be noted that, since this embodiment of the invention produces four scalar values, it will enable to solve a system of four equations with four unknown parameters, which allows to use this embodiment for characterizing two overlapping pulse sequences simultaneously carried by a same received signal Y.

Besides, in a case where multiple pulse sequences or pairs of pulse sequences are carried on multiple sub-bands, a parallel array consisting of multiple signal characterization means SCM such as those previously described may advantageously be used for characterizing said multiple pulse sequences or pairs of pulse sequences.

In the embodiment of the invention shown here, the phase quadrature demodulator PQDM includes two mixers M10 and M20 intended to be fed with the received signal Y, on the one hand, and by demodulation signals S10 and S20 in phase quadrature with each other and having a so-called central frequency Fpc, the third and fourth sinusoidal signals S21 and S22 being then respectively formed by the first and second sinusoidal signals S11 and S22.

The central frequency is usually chosen in the art as equal to a median frequency for a spectral distribution of the energy carried by the incoming pulse sequences. If, for example, these pulse sequences feature a frequency varying from 3.1 to 10.6 GHz, the central frequency Fpc may be chosen close to 6.35 GHz.

In the embodiment shown here, the detection means further include:
- an oscillator OSC, for example a voltage-controlled oscillator, intended to generate an output signal from which the first and second sinusoidal signals S11 and S12 will be derived, and
- a frequency multiplier FMULT intended to receive said output signal and to deliver respective first and second demodulation signals S10 and S20 to the mixers M10 and M20 included in the phase quadrature demodulator PQDM.

Such an embodiment of the invention thus enables to obtain optimal clock stability by using a same oscillator OSC at the receiving end for performing both a demodulation and a detection of an incoming pulse sequence.

In other embodiments of the invention, one may also choose to use a high-frequency oscillator for producing the first and second demodulation signals S10 and S20, and to use a frequency divider for producing the first and second sinusoidal signals S11 and S12 on the basis of the signals outputted by such a high-frequency oscillator.

It seems worthy of notice that the embodiment of the signal characterization means SCM shown in FIG. 6 may be considered as a particular application of the embodiment of the signal characterization means SCM shown in FIG. 7, for which a central frequency Fpc equal to 0 will have been chosen, which means, in other terms, that the embodiment shown in FIG. 6 is well-suited for baseband applications.

Figure 8:
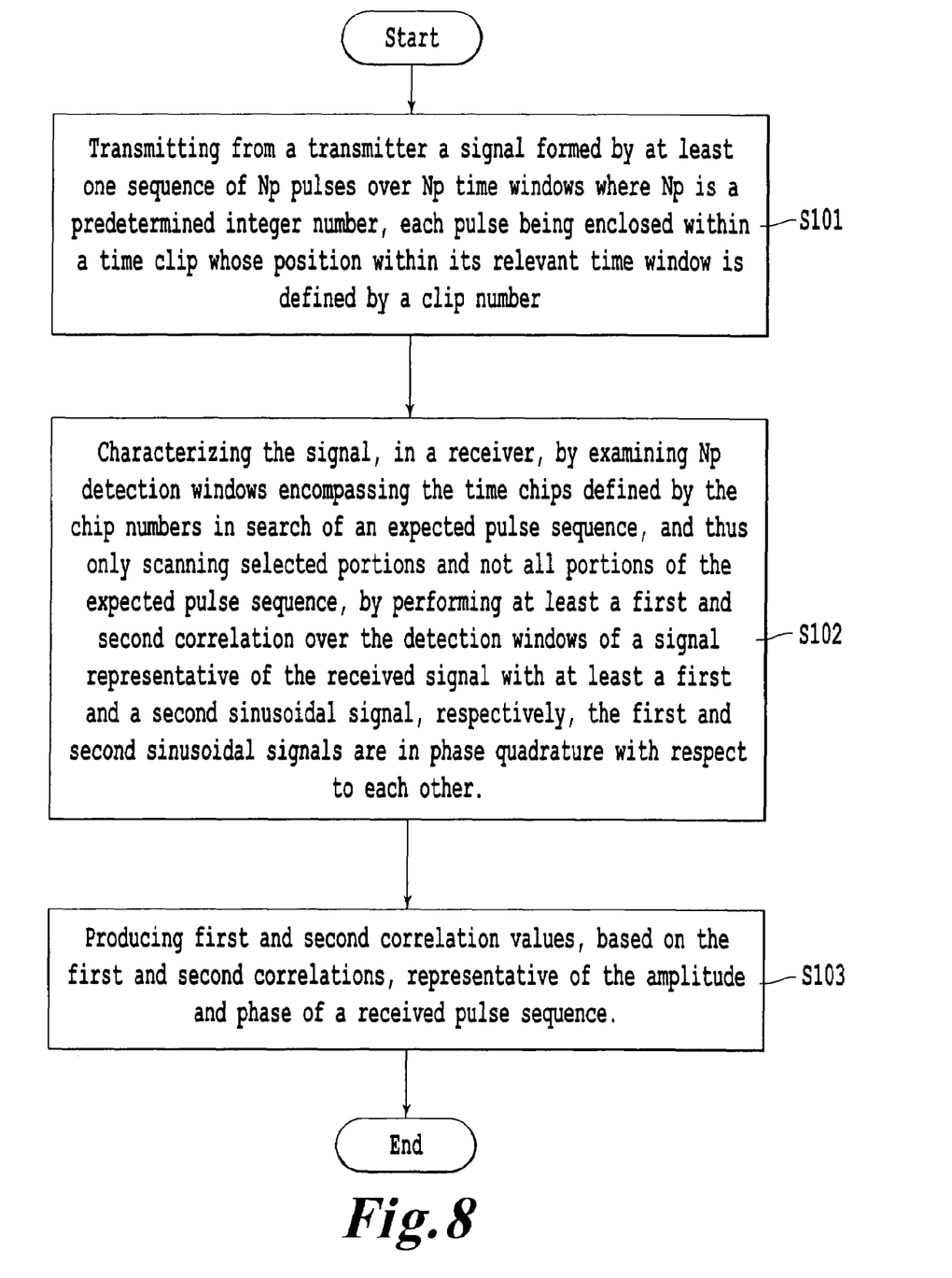
FIG. 8 is a flow chart depicting a method for transmitting data in a telecommunication system.

FIG. 8 shows a flow chart with steps S101, S102, and S103 depicting a method for transmitting data in a telecommunication system.

The invention claimed is:

1. A method for receiving data in a telecommunication system including at least one transmitter and one receiver, the method comprising:
   transmitting from said transmitter a signal formed by at least one sequence of Np pulses over Np time windows where Np is a predetermined integer number, each pulse being enclosed within a time chip whose position within its relevant time window is defined by a chip number;
   characterizing said signal, in said receiver, by examining Np detection windows encompassing the time chips defined by the chip numbers in search of an expected pulse sequence, and thus only scanning selected portions and not all portions of said expected pulse sequence, by performing at least a first and a second correlation over said detection windows of a signal representative of the received signal with at least a first and a second sinusoidal signal, respectively, said first and second sinusoidal signals are in phase quadrature with respect to each other; and
   producing first and second correlation values, based on said first and second correlations, representative of the amplitude and phase of a received pulse sequence.

2. A telecommunication system, comprising:
   at least one transmitter and one receiver, said transmitter configured to transmit a signal formed by at least one sequence of Np pulses over Np time windows where Np is a predetermined integer number, each pulse being enclosed within a time chip whose position within its relevant time window is defined by a chip number, and the receiver includes a signal characterization unit configured to perform an examination of Np detection windows encompassing the time chips defined by the chip numbers in search of an expected pulse sequence, and thus only selected portions, and not all portions, of said expected pulse sequence are scanned; and
   a detection unit including at least first and second correlation means for correlating a signal representative of the received signal with at least a first and a second sinusoidal signal, respectively, in which first and second sinusoidal signals are in phase quadrature with respect to each other, said first and second correlation means configured to be activated during said detection windows and to produce first and second correlation values representative of the amplitude and phase of a received pulse sequence.

3. A telecommunication system as claimed in claim 2, in which the characterization unit further comprises:
   at least third and fourth correlation means for correlating a signal representative of the received signal with at least a third and a fourth sinusoidal signal, respectively, in which third and fourth sinusoidal signals are in phase quadrature with respect to each other, said third and fourth correlation means configured to be activated during said detection windows and to produce third and fourth correlation values representative of the amplitude and phase of a received pulse sequence; and
   a phase quadrature demodulator configured to be fed with the received signal and to respectively deliver a first and a second demodulated signal to the first and second correlation means, on the one hand, and to the third and fourth correlation means, on the other hand, and the first and second demodulated signals are in phase quadrature with respect to each other.

4. A telecommunication system as claimed in claim 3, wherein a phase quadrature demodulator includes two mixers configured to be fed with the received signal, and with demodulation signals in phase quadrature with each other having a central frequency, the third and fourth sinusoidal signals being respectively formed by the first and second sinusoidal signals; and the characterization unit further includes
an oscillator configured to generate an output signal from which the first and second sinusoidal signals will be derived, and
a frequency multiplier configured to receive said output signal and to deliver respective first and second demodulation signals to the phase quadrature demodulator.

5. A telecommunication system as claimed in claim 2, in which the receiver further comprises:

a plurality of accumulating modules, each configured to accumulate output values delivered by one of said at least first and second correlation means;
a plurality of squaring modules, each configured to produce a squared value of the contents of one of said accumulating module; and
an adder configured to compute a sum of output values delivered by the squaring modules in order to produce the detection value to be compared to a predetermined threshold value.

6. A telecommunication apparatus, comprising:

a receiver configured to receive a signal formed by at least one sequence of Np pulses over Np time windows where Np is a predetermined integer number, each pulse being enclosed within a time chip whose position within its relevant time window is defined by a chip number;
a signal characterization unit configured to perform an examination of Np detection windows encompassing the time chips defined by the chip numbers in search of an expected pulse sequence, and thus only selected portions, and not all portions, of said expected pulse sequence are scanned, said characterization unit including at least first and second correlation means for correlating a signal representative of the received signal with at least a first and a second sinusoidal signal, respectively, which first and second sinusoidal signals are in phase quadrature with respect to each other, said first and second correlation means configured to be activated during said detection windows and to produce first and second correlation values representative of the amplitude and phase of a received pulse sequence.

7. A device, comprising:

a receiver configured to receive a signal formed by at least one sequence of Np pulses over Np time windows where Np is a predetermined integer number, each pulse being enclosed within a time chip whose position within its relevant time window is defined by a chip number, said device is configured to perform an examination of Np detection windows encompassing the time chips defined by the chip numbers in search of an expected pulse sequence, and thus only selected portions, and not all portions, of said expected pulse sequence are scanned; and
at least first and second correlation means for correlating a signal representative of the received signal with at least a first and a second sinusoidal signal, respectively, which first and second sinusoidal signals are in phase quadrature with respect to each other, said first and second correlation means configured to be activated during said detection windows and to produce first and second correlation values representative of the amplitude and phase of a received pulse sequence.

8. A telecommunication system, comprising:

at least one transmitter and one receiver, said transmitter configured to transmit a signal formed by at least one sequence of Np pulses over Np time windows where Np is a predetermined integer number, each pulse being enclosed within a time chip whose position within its relevant time window is defined by a chip number, and the receiver includes a signal characterization unit configured to perform an examination of Np detection windows encompassing the time chips defined by the chip numbers in search of an expected pulse sequence, and thus only selected portions, and not all portions, of said expected pulse sequence are scanned; and
a detection unit including at least first and second correlation units configured to correlate a signal representative of the received signal with at least a first and a second sinusoidal signal, respectively, in which first and second sinusoidal signals are in phase quadrature with respect to each other, said first and second correlation units configured to be activated during said detection windows and to produce first and second correlation values representative of the amplitude and phase of a received pulse sequence.

* * * * *

UNITED STATES PATENT AND TRADEMARK OFFICE
CERTIFICATE OF CORRECTION

PATENT NO. : 7,519,108 B2  Page 1 of 1
APPLICATION NO. : 11/085517
DATED : April 14, 2009
INVENTOR(S) : Paquelet It is certified that error appears in the above-identified patent and that said Letters Patent is hereby corrected as shown below:

On the title page, the Terminal Disclaimer information has been omitted. Item (45) and the Notice information should read as follows:

Item --(45) **Date of Patent: * Apr. 14, 2009**

( * ) Notice: Subject to any disclaimer, the term of this patent is extended or adjusted under 35 U.S.C. 154(b) by 750 days.

This patent is subject to a terminal disclaimer.--

Signed and Sealed this

Nineteenth Day of May, 2009

JOHN DOLL
*Acting Director of the United States Patent and Trademark Office*